United States Patent Office 3,215,486
Patented Nov. 2, 1965

3,215,486
FIXATION OF POLYPROPYLENE FIBERS IMPREGNATED WITH DYESTUFFS AND OTHER TREATING AGENTS
Buei Hada, Tsukaguchi, Amagasaki, and Tomohide Yasumura, Shiga-gun, Shiga-ken, Japan, assignors to Toyo Spinning Co., Ltd., Osaka, Japan
Original application Apr. 17, 1962, Ser. No. 188,195. Divided and this application July 30, 1963, Ser. No. 305,570
Claims priority, application Japan, Apr. 20, 1961, 36/14,085; Oct. 31, 1961, 36/39,575
8 Claims. (Cl. 8—74)

The present application is a division of copending application Serial No. 188,195, filed April 17, 1962.

The present invention relates to novel structured polypropylene fibres or filaments, and to treatments of such novel polypropylene fibres or filaments.

Polypropylene fibres are notoriously poor in affinity or reactivity with dyestuffs and other treating agents, in comparison with other synthetic fibres. A number of efforts and researches have been made in this field to improve their reactivity or affinity with various treating agents, particularly dyestuffs, but no fully satisfactory method has yet been developed.

Therefore, it is an object of this invention to provide novel filaments or fibres of polypropylene which are excellent in dyeability, water absorbency and treating agent absorbency.

It is is a further object of this invention to provide processes for treating such novel polypropylene fibres with dyestuffs and other treating agents.

It is a still further object of this invention to provide processes for preventing the dyestuffs and other treating agents from being removed from the so treated fibres.

Other objects, features and advantages of this invention will be apparent from the following description and accompanying drawings in which.

According to this invention there are provided structured isotactic polypropylene filaments with numberless sub-microscopic, ultra-fine voids distributed throughout the filaments both in cross-section and in length.

The voids contained in the novel filaments or fibres of this invention are so small that it is difficult or rather impossible to recognize each of these voids by means of a presently commercially available optical microscope. The voids can be recognized only by an examination with electron-microscope. However, it is very difficult to make an ultra-thin section (less than $0.01\mu$) of a polypropylene fibre, and therefore only the existence of the voids in the sample of the structured fibres of this invention can be observed even with the electron-microscopic examination and it is difficult to measure exactly the size of the voids or their state of distribution. The size of most voids, however, is recognized to be smaller than $0.1\mu$ with such electron-microscopic examination.

The size, quantity, distribution, etc. of these ultra-fine voids existing in the new filaments of this invention can, however, be determined by the following means.

Each of the voids can not be recognized by means of an optical micropscope under ordinary or bright-field illumination. Since the resolving power of the optical microscope under bright-field illumination is about $0.3–0.5\mu$, the voids are substantially smaller than $0.5\mu$ in size, except of course those voids which are incidentally formed and are also seen in usual polypropylene fibres.

Figure 1A:
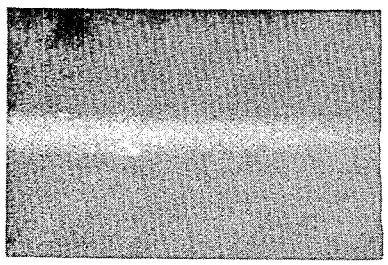
FIG. 1a is an optical micrograph of a side view of a filament of this invention as observed by an optical microscope under dark field illumination.
Figure 1B:
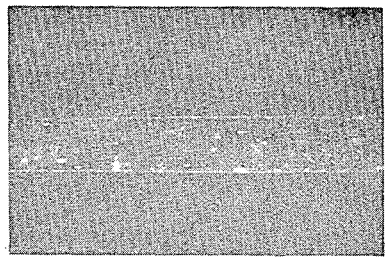
FIG. 1b is an optical micrograph similar to FIG. 1a but showing that of a conventional non-structured filament.
Figure 2A:
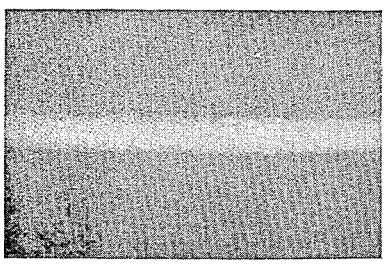
FIG. 2a is an optical micrograph of a side view of a filament of this invention filled with $TiO_2$, as observed by an optical microscope under dark field illumination.
Figure 2B:
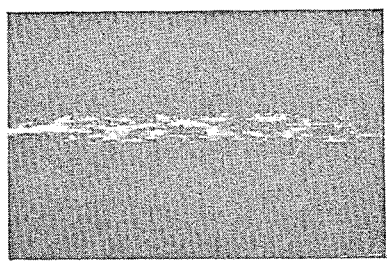
FIG. 2b is an optical micrograph similar to FIG. 2a but showing that of a conventional non-structured filament.

When the filament of this invention is observed from the side thereof by the optical-microscope under dark field illumination, the whole fibre under observation is seen to be glimmering, but it is difficult to distinguishably recognize or detect each or individual void (FIG. 1a and FIG. 2a). This may be comparable with a nebula which is glimmering as a whole but in which no individual star can be recognized. Since the resolving power of the optical microscope under dark field illumination is less than $0.1\mu$, it can thus be said that most of the voids present in the novel fibres of this invention are smaller than $0.1\mu$ in size. By way, a conventional non-structured polypropylene fibre having no such voids as our invention does not show glimmering phenomena, under the similar microscopic observation, but is seen to be transparent except for those rather sharp bright spots which are caused by impurities or cracks present in the fibre (FIG. 1b and FIG. 2b).

Further, the void size may also be indirectly determined from the molecular size of dyestuffs and other treating agents which can sufficiently be absorbed by the fibres of this invention. Thus, it may be said that the fibres of this invention contain a considerable number of voids larger than $0.005\mu$ in size.

The quantity of the voids or total volume of the voids per unit weight of the novel structured filament can be determined in terms of the water-absorbency and solvent-absorbency of the fibres.

In determining the water absorbency, the polypropylene fibres are dipped in a 0.5% aqueous solution of a penetrating agent (Liponox N C K) at 20° C. for 48 hours and then are dehydrated by a centrifugal dehydrator (centrifugal force 1370G) for 5 minutes and weighed to measure the increase in weight. The water absorbency is expressed by the increased weight divided by the original weight of the fibres, in percent. The new polypropylene fibres of this invention have more than 2.0% in water absorbency. In contrast thereto, the water-absorbency of conventional polypropylene fibres is less than 1.0%. However, there may be an error in such water absorbency because there occurs also an absorption of the penetrating agent which is employed to facilitate the water penetration. For this reason, it is preferable to depend on the following solvent-absorbency.

In determining the solvent-absorbency, the polypropylene fibres in an amount of about 0.3 g. are dipped in 100 ml. of o-dichlorobenzene for 24 hours at a room temperature (20° C.), and then are subjected to centrifugal liquid separation by means of a centrifugal dehydrator (1370G) for 5 minutes. The fibres are weighed to measure the weight increase, which is divided by the original weight of the fibres and expressed in percent. The structured polypropylene fibres with voids of this invention have a solvent-absorbency of more than 25% and even as high as 110% or more in some instances. In contrast thereto, conventional polypropylene fibres have a solvent-absorbency of less than 20%.

The voids are distributed throughout the polypropylene fibre or filament, both in the longitudinal and transverse directions of the fibre. This distribution is evident from the fact that, as mentioned before, the fibre of this invention is glimmering in its entirety when observed by an optical microscope under dark-field illumination. Each or individual void is very difficult or rather impossible to be identified. This is apparent, for example, from the micrograph of FIG. 1a. In contrast thereto, in a conventional polypropylene fibre, no such glimmering appears under the same microscopic observation, but there are observed sharp or distinctive strong bright spots which are caused by non-transmittent impurities or cracks present in the fibre and which are different and distinguishable from the glimmering of our fibres.

Figure 3A:
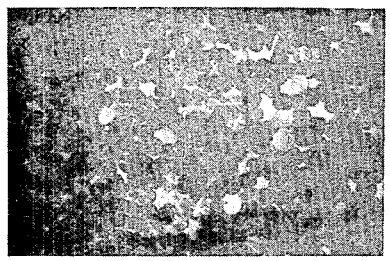
FIG. 3a is an optical micrograph of a hand cross section (about 0.5 mm. in thickness) of filaments of this invention, as observed by an optical microscope under ordinary illumination.
Figure 3B:
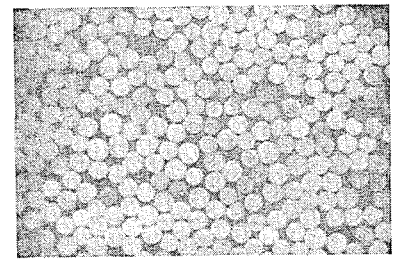
FIG. 3b is an optical micrograph similar to FIG. 3a but showing that of conventional non-structured filaments.

A unique feature of the fibres of this invention by virtue also of which they are sharply distinguishable from known polypropylene fibres is in the fact that when hand-cut sections (each about 0.5 mm. in thickness) of the fibres of this invention are observed through an optical microscope under bright-field or ordinary illumination, they appear cloudy and light yellow or dark yellow throughout the sectional area, but no such phenomena is seen in conventional polypropylene fibres having no such voids as this invention. This fact will be apparent from the comparison of FIG. 3a and FIG. 3b, color being omitted.

The novel polypropylene fibres or filaments of this invention can thus be well defined by the various factors mentioned hereinabove.

The novel polypropylene fibres can not be produced by methods conventionally employed for manufacturing porous, spongy or foamed articles of synthetic resins. Thus, the novel fibres can not be produced by employing a blowing or gasifiable agent such as volatile solvent e.g. xylene or by treating fibres with a swelling agent (e.g., chlorobenzene, tetraline) for polypropylene.

One method for producing the novel fibres is to homogeneously mix a water soluble salt in solid state of a size smaller than about $0.5\mu$ in diameter with a molten polypropylene resin, which is extruded through a spinning nozzle to form filaments. The filaments, after being cooled and stretched, are immersed in warm water for a long time to dissolve the ultra-fine salt particles out of the fibres. However, this procedure is difficult to operate and the produced fibres are poor in mechanical strength.

We have discovered that the polypropylene filaments having the novel structure described before can conveniently be produced by the following method.

Preferably, a fibre-forming homopolymer of propylene is used, but a fibre-forming resin consisting of a copolymer of propylene with a small amount (less than 15%) of an olefinic monomer such as ethylene, butene or a diene monomer such as butadiene, isoprene may be employed. If desired, a fibre-forming resin blend composed of a predominant amount of a propylene polymer and a small amount (less than 15%) of at least one polymer of the above mentioned olefinic or diene compound may also be used. Therefore the term "polypropylene" as used throughout the specification and claims is intended to include propylene homopolymers, polymer blends and copolymers mentioned above. As for the fibre-forming resin, it is preferable to employ an isotactic polypropylene resin having a relatively small molecular weight (preferably about 30,000 to 80,000) and a large melt index (as measured by the method of ASTM-D-1238-57 TE).

The above resin is heat melted and extruded through a spinning nozzle at a temperature as low as possible within a temperature range which permits satisfactory spinning of the molten resin. If desired a filler such as titanium oxide, anti-oxidant, stabilizer, etc. which are conventionally used as additives for polypropylene may be added to the molten resin in a conventional manner and amount as well known in the art. Generally the resin is extruded at a temperature of from 200° C. to 260° C. through a conventional spinning nozzle and the filaments are cooled and solidified. In this case it is important that the cooling be effected slowly to obtain unstretched filaments having the so-called monoclinic crystalline structure and a high degree of crystallization. Thus, for example, there is provided a first cooling zone extending at least about 5 cm., preferably 10–20 cm., downwardly from the lower face of the nozzle. The first cooling zone is constituted by ambient atmosphere heated to a temperature between 100° C. and 160° C. by a suitable means such as heating by infrared ray, electric heater, steam or the like. Below the first cooling zone and extending downwardly therefrom is a temperature controlling cylinder or chamber providing a second cooling zone therein. Into and through this chamber is passed a current of an inert gas such as nitrogen gas or air preheated at a temperature between 70° C. and 90° C. The temperature control of the chamber described above may be effected, if necessary, by providing a suitable heating or cooling means with the chamber or cylinder. The length of the chamber may vary depending upon the spinning condition, but usually a length of about 1–4 m. is employed. Any other suitable means may be employed to effect a slow cooling which would result in the production of unstretched fibres having monoclinic structure.

During passage through the controlled cooling zone the filaments are gradually and slowly cooled to obtain unstretched filaments with monoclinic crystalline structure. The non-stretched fibres should preferably be high in the degree of crystallinity and also in molecular orientation.

As the crystallization proceeds the specific gravity of the fibres or filaments increases, and therefore the degree of crystallinty of fibres can be determined in terms of the specific gravity of the fibres. Meanwhile, as the molecular orientation increases, the index of birefringence increases, while the degree of orientation as determined by the half width of (110) diffraction curve of X-ray pattern is also increased. Therefore, the degree of molecular orientation can be determined by measuring these values.

The specific gravity of fibres is measured by means of a "density gradient tube" of an isopropanol-water system at 30° C. after 24 hours. If the fibres contain a filler such as titanium oxide it must be compensated in determining the specific gravity. It is necessary that the non-stretched fibres have a specific gravity higher than 0.890 as measured above.

The degree of orientation may be determined in terms of the index of birefringence of the fibres. The index of birefringence is calculated by the following formula:

$$\Gamma = n_{11} - n_1$$

$$\text{Index of birefringence} = \frac{\Gamma}{d}$$

wherein $d$ is the diameter of a single fibre, $n_{11}$ is the refraction index parallel to the fibre axis, $n_1$ is the refraction index vertical with respect to the fibre axis, an $\Gamma$ is the value of retardation as measured by a polarizing microscope with a Berek compensator. It is necessary that the non-stretched fibres have an index of birefringence higher than 0.010, preferably higher than 0.012.

Alternatively or additionally, the degree of molecular orientation of fibres may also be determined as follows:

The fibres are superposed in alignment to a thickness of 50 mg./cm.² Then X-ray is irradiated to the fibres in the direction perpendicular to the axial direction of the fibres and the (110) diffraction intensity is measured along the Debye-ring to plot a curve. From this curve is measured to half width ($\beta$), while compensating for the scattering caused by the non-crystalline portion. The degree of orientation is calculated from the following formula:

$$\text{Degree of orientation (percent)} = \frac{180 - \beta}{180} \times 100$$

It is preferable that the non-stretched fibres have a degree of orientation higher than 70%, more preferably higher than 80%.

The non-stretched fibres coming out of the cooling zone are then wound or collected on a drum or bobbin. Since the non-stretched filaments or fibres should have a high degree of orientation as mentioned above, it is preferable that the fibres are wound at a high speed (e.g. higher than 200 m./min.) and the drawing ratio (ratio of the filament winding speed to the speed of filaments at the spinning nozzle) is high, namely higher than 200 and more preferably higher than 300. In any event it is important that the fibres are so spun and drawn that their degree of orientation is within the range specified above.

As mentioned above, the non-stretched fibres should have a specific gravity higher than 0.890, most of the fibres so produced have a specific gravity lower than 0.900. Therefore, it is preferable to subject the fibres to a seasoning or aging treatment to promote crystallization so that the specific gravity is increased up to 0.900 or higher. If the fibres spun and drawn as mentioned above have a specific gravity higher than 0.900 it is not always necessary to carry out the seasoning treatment although it is preferable to carry out such treatment in any case.

The fibres may be subjected to the seasoning treatment, in any form such as in the form of tow, as wound on a bobbin or reel. The seasoning may be effected under atmospheric conditions, but preferably in hot air or steam.

The temperature of the aging may vary widely within the range from 20° C. to 160° C., preferably from 60° C. to 140° C. The time of aging may also vary from a few seconds to several tens of hours, and may be shorter at a higher temperature within the range specified above. Preferably, the treatment or aging is conducted at a temperature of from 100° C. to 130° C. for 30 minutes to 1 hour. In any event, however, it is necessary that the aging is effected so that the resulting fibres have a specific gravity of higher than 0.900, preferably higher than 0.903 when measured by the method specified before.

As mentioned above, it is preferable to collect or wind the unstretched cold fibres on a bobbin, drum or the like before subjecting to the seasoning or aging treatment. However, if desired, the formed filaments may be subjected directly to the seasoning or aging treatment without collecting or winding on a bobbin or drum as mentioned above.

The seasoned or aged fibres are then subjected to stretching. The stretching may be effected in a conventional manner. Thus the stretching is conducted by passing the fibres through a hot medium conventionally employed in the art of stretching, such as hot air, hot water or pressured steam at a temperature between 90° C. and 140° C. During the passage through the hot medium the fibres are stretched. A higher stretching ratio is preferred, and usually the fibres are stretched from 1.5 to 7 times their original length. The temperature for carrying out the stretching is preferable to be lower within the range specified above.

During this stretching stage, voids of the present invention are formed in the fibres.

The structured polypropylene fibres thus obtained have ultra-fine voids distributed throughout the same as detailed before and yet have mechanical properties comparable with those of conventional polypropylene fibres. Thus, for example, the fibres with such voids of this invention can have a strength of 3–9 g./denier and an elongation of 20–100%.

Since the fibres or filaments of this invention contain numberless ultra-fine voids, they can satisfactorily absorb various dyestuffs such as azoic or naphthol dyes, dispersed dyes, oil dyes, metallized dyes, vat dyes, sulfur dyes, acid dyes, basic dyes, mordantable dyes so that they are readily dyed deeply and uniformly. Furthermore, the fibres can uniformly and sufficiently absorb other treating agents such as polymerizable compounds (e.g. vinyl monomers), heat-stabilizers, light-stabilizers, antistatic agents, etc.

The important and remarkable advantages of the fibres of this invention reside in the fact that the fibres can be readily treated with the above mentioned dyes and other treating agents with excellent affinity. In view of the fact that polypropylene fibres are notorious for fatally poor affinity or reactivity with dyestuffs and other treating agents, it is surprising that the treated fibres of this invention are excellent in fastness. It is believed that this excellent fastness in our novel polypropylene fibres is due to the extremely small size of the voids which are distributed throughtout the fibres as explained before. Thus, when the fibres of this invention are treated with a treating agent, the latter will readily penetrate impregnatingly into the fibres. Once the treating agent has penetrated into the voids, it is retained therein by the adsorptive power of the polypropylene and is brought into such state that it will not leave the fibres. Although the adsorptive power of polypropylene itself is rather poor, the voids are so small in size that the adsorptive power in each void is sufficiently high to firmly retain the molecule(s) of the treating agent therein. This explanation is evidenced by the fact that the solvent retentivity of the fibres of this invention is higher than 1% (and even as high as 40% or more in some instances). This feature is unique in the fibres of this invention and can not be seen in polypropylene fibres of the prior art. The solvent retentivity is measured as described in Example 1 hereinafter given.

Further distinctive feature of the fibres of this invention is in the fact that they have a water-retentiviy higher than 1%, and even higher than 10% in some cases. As well known, polypropylene fibres are most hydrophobic among known synthetic fibers and their water-retentivity is usually below 0.1%. Therefore conventional polypropylene fibres are extremely high in electrostaticity which causes various troubles in handling such as spinning, weaving, finishing, etc. In contrast thereto, the polypropylene fibres of this invention can retain a larger amount of water as mentioned above and therefore the electrostaticity is decreased so that the fibres of this invention do not exhibit the disadvantages caused by electrostaticity. The water-retentivity as mentioned herein is measured by the method described in Example 1 hereinafter given.

As explained before, the fibres of this invention have ultra-fine voids therein and according are excellent particularly in dyeability. Examples of dyestuffs and intermediates thereof useful in dyeing the polypropylene fibres of this invention are oil colors such as Solvent Yellow 2 (C.I. 11020), Solvent Yellow 5 (C.I. 11380), Solvent Yellow 14 (C.I. 12055), Solvent Orange 7 (C.I. 12140), Solvent Red 4 (C.I. 12170), Solvent Red 24 (C.I. 26105), Solvent Brown 5 (C.I. 12020), etc.; dispersed colors such as Disperse Yellow 1 (C.I. 11855), Disperse Yellow 3 (C.I. 11855), Disperse Yellow 7 (C.I. 26090), Disperse Yellow 31 (C.I. 4800), Disperse Yellow 33, Disperse Orange 5 (C.I. 11100), Disperse Red 1 (C.I. 11110), Disperse Red 7 (C.I. 11150), Disperse Red 9 (C.I. 60505), Disperse Violet 6 (C.I. 61140), Disperse Violet 12 (C.I. 11120), Disperse Blue 23 (C.I. 61545), Disperse Black 1 (C.I. 11365), Disperse Black 3 (C.I. 11025), etc.; sulfur colors such as Sulfur Yellow 4 (C.I. 53160), Sulfur Blue 2 (C.I. 53480), Sulfur Blue 5 (C.I. 53235), Sulfur Green 6 (C.I. 53530), etc.; vat colors such as Vat Yellow 20 (C.I. 68420), Vat Orange 5 (C.I. 73335), Vat Red 1 (C.I. 73360), Vat Blue 3 (C.I. 73055), etc.; diazo components of azoic colors such as aniline, chloroaniline, 2-amino-5-nitroanisole, nitroaniline, toluidine, phenetidine, 4-benzamide-2,5-dimethoxyaniline, 4-amino-4' - methoxydiphenylamine, 4,4'-diamino-di-phenylamine, etc.; coupling components for azoic colors such as β-naphthol, α-naphthylamine, 3-hydroxy-2-naphthoanilide, 3-hydroxy-N-1-naphthyl - 2-naphthoamide, 4,4'-bisacetoamide, 4,4' - bisacetoaceto-o-toluidine, 3-hydroxy-N-2-naphthyl-2-naphthoamide, 3-hydroxy-2-naphtho-4'-chloro-o-toluidine, 2 - α-acetylacetoamide - 6 - ethoxybenzothiazole, 3-hydroxy-2',5'-dimethoxy-2-naphthoanilide, α,α'-terephthaloyl-bis(4-chloro - 5-methyl-o-acetoanisidide), etc.; basic colors such as Basic Yellow 2 (C.I. 41000), Basic Orange 2 (C.I. 11270), Basic Red 1 (C.I. 45160), Basic Violet 3 (C.I. 42555), Basic Blue 24 (C.I. 52030), Basic Brown 1 (C.I. 21000), etc.; triazines containing one or two hydrogen atoms on the triazine ring, and dyestuffs containing such a triazine; halogenated alkylene acylhalides, and dyestuffs containing such a acylhalide; reactive colors such as dyestuffs containing an epoxy radical; various whitening agents such as those of the stilbene type, imidazole type, thiazole type, oxazole type, imidazolone type, triazole type, oxazole type, imidazolone type, cumarine type, carbostyril type, biphenyl type, pyridine type, pyrazoline type, etc.; various pigments such as Pigment Yellow 1 (C.I. 11680), Pigment Orange 5 (C.I. 12075), Pigment Red 3 (C.I. 12120), Pigment Blue 1 (C.I. 42595), carbon black, etc.; acid dyes such as Acid Yellow 72, Acid Red 139, Acid Blue 138 (C.I. 62075), Acid Blue 139, Acid Brown 49, Acid Green 27, Acid Violet 51, etc.; metal-containing dyes such as Acid Yellow 116, Acid Orange 88, Acid Red 211, Acid Blue 168, Acid Brown 19, Acid Violet 68, Acid Yellow 101, Acid Orange 62, Acid Red 183, Acid Blue 158A, Acid Green 12, Acid Violet 56, etc.

Various other treating agents such as light-stabilizers, heat-stabilizers, surfactants, softeners, flame resistors, antistatic agents, mordanting agents, etc. are also satisfactorily absorbed by the novel fibres of this invention. Examples of light-stabilizers are salicylic acid esters or their derivatives, benzophenone derivatives such as 2-hydroxy-4-dodecyloxybenzophenone, p-phenylenediamine and derivatives thereof, benzotriazole derivatives; organic sulfur compounds, etc. Examples of heat-stabilizers include various phenol derivatives which are known in the art.

Among the dyestuffs and treating agents mentioned above, those organic compounds having a molecular weight not more than 500 and containing no such extremely hydrophilic groups as sulfonic acid group, carboxylic acid group, sulfuric acid group, ammonium group, etc. are preferred.

In applying these dyestuffs and other treating agents to the novel structured polypropylene fibres of this invention, the dyestuffs or treating agents may be employed in the form of aqueous solution, aqueous dispersion or non-aqueous dispersion. It is also possible to employ them in the form as dissolved or dispersed in a mixture of water and non-aqueous medium. Example of such non-aqueous mediums are lower aliphatic alcohols such as methanol, ethanol, etc.; lower aliphatic ketones such as acetone, methyl ethyl-ketone, cyclohexanone; lower aliphatic acid esters such as ethyl formate, butyl acetate, etc.; halogenated hydrocarbons such as carbon tetrachloride, trichlene, perchlene, chlorobenzene, etc.; hydrocarbons such as heptane, cyclohexane, benzene, xylene, tetraline, decaline, etc.; nitrogen-containing organic compounds such as pyridine, formamide, dimethylformamide, etc.; ethers such as methyl ether, ethyl ether, dioxane, etc. A mixture of two or more of these organic solvents may also be used.

Although a solution or dispersion of a dyestuff or treating agent in a non-aqueous medium alone may be used, it is preferable to use an aqueous liquid mixed with 0.5–30% by weight of a non-aqueous solvent as the medium for the dyestuff or treating agent in order to avoid hardening of the polypropylene fibres as far as possible.

In preparing a dispersion of a dyestuff or other treating agent, a dispersing agent may be used in a conventional manner to facilitate dispersion and stabilize the same. Any of anionic, cationic, non-ionic and amphoionic surfactants which are well known in the art may be used as the dispersing agent. The amount or concentration of the dispersing agent may vary depending upon the particular dyestuff, treating agent employed, amount thereof, the particular non-aqueous medium and its amount, etc. Generally, the dispersing agent is employed in a concentration of about 0.01% to 3% by weight in the medium.

In treating polypropylene fibres of this invention with a treating liquid (a dispersion or solution of a dye or a treating agent as mentioned above), the fibres are immersed in the treating liquid at a raised temperature, preferably higher than 80° C., for a sufficient time so that the fibres are fully impregnated with the treating liquid. Alternatively the treatment may be carried out by the so-called padding method wherein the fibres are dipped in a concentrated treating liquid for a short time, squeezed uniformly and treated at a high temperature (e.g. higher than 120° C.).

When the fibres are so treated, the dyestuff or treating agent penetrates into the fibres and is retained fastly therein so that it will not readily be removed from the fibres during the usual handling of the fibres such as wearing and laundering. However, the fastness, particularly washing fasteness, is further remarkably improved if the so treated fibres are subjected to an after-treatment for enlarging the molecular dimensions of the dye or treating agent as absorbed in the fibres and/or reducing, diminishing or even substantially dissipating the voids, as detailed below.

In order to carry out an after-treatment for enlarging or increasing the molecular dimensions of the compound absorbed in the fibres, the fibres may be treated with a compound which is capable of reacting with the compound contained in the fibres to enlarge or increase the molecular dimensions of the latter. However, it is preferable to preliminarily impregnate the fibres with compounds which are capable of reacting with each other to produce a compound of larger molecular dimensions and then subjecting the fibres to conditions under which the said reaction takes place. Thus, for example, an aromatic compound (diazo component) having an active amine group and a coupling component such as naphthol, naphthylamine, active methylene compound are absorbed together in the fibres in a manner as described before, and then the fibres are treated at a temperature of 60–100° C. for 10–60 minutes in the presence of an acid and nitrite so as to diazotize the diazo component and couple the same with the coupling component. The polypropylene fibres dyed in this manner are class 5 in fastness to washing (AATCC—NO. 2), class 5 in fastness to rubbing (as measured by the friction tester, Japan Society for Promotion of Scientific Research) and class 4–5 in fastness to light (as measured by Fade-O-Meter for 20 hours) and the dyed fibres were deep and fast. Another example is to absorb a compound having an active amino group and a triazine having at least one halogen atom together in the fibres and then to treat the fibres at a temperature of 40–100° C. in the presence of an alkaline substance such as caustic soda, sodium carbonate or the like so as to react the compounds forming a molecularly larger dyestuff within the voids of the fibres. A further example is to absorb an aromatic amine and a quinoline (or a phenol) together in the fibres and subsequently react them with each other. A still further example is to absorb thioindoxyl carboxylate and an aromatic nitroso compound in the fibres and then to react them with each other. In any event, compounds of larger molecular dimensions are produced within the voids in the fibres and their fastness or washability is remarkably improved. It is also possible to absorb an alkylene oxide in the fibres and then to ring-opening-polymerize the alkylene oxide. Still another example is to absorb an epoxy radical-containing compound and an active amino compound together in the fibres and then to react them within the voids in the fibres. Other methods will be apparent to those skilled in the art from the above examples.

In addition or alternatively to the above treatment for enlarging or increasing the molecular dimensions of the compounds absorbed in the fibres, it is preferable to reduce, diminish or substantially dissipate the voids to embed or confine the dyestuff or treating agent within the fibres.

In reducing, diminishing, vanishing or dissipating the voids of the fibres after treated with dyestuffs or treating agents as explained before, the treated fibres are brought into contact with a vapor of an organic compound or solvent which is capable of swelling or plasticizing polypropylene resin, or the fibres are impregnated with the said solvent and then the solvent is gradually evaporated. Alternatively, the treated polypropylene fibres, in relaxed state, are exposed to an atmosphere at a temperature of 120–160° C. and substantially free from the solvent mentioned above. These treatments are effective not only in improving fastness of the treated fibres as mentioned above but also in improving the transparency.

Examples of the organic compounds or solvents which are capable of swelling or plasticizing polypropylene resins and which are useful in the above mentioned void diminishing, reducing or dissipating treatment are aliphatic hydrocarbons such as hexane, heptane, octane, etc., cyclic hydrocarbons such as benzene, toluene, xylene, tetraline, decaline, etc.; halogenated hydrocarbons such as carbon tetrachloride, tetrachloroethane, chlorobenzene, etc.; ketones such as methyl ethyl ketone, cyclopentanone, cyclohexanone, etc.; esters such as ethyl formate, butyl acetate, etc.; alcohols such as ethyleneglycol, cyclohexanol, etc. which have an affinity with polypropylene.

In carrying out the solvent treatment, the solvent is vaporized by heating or under vacuum and the fibres are placed or hung in the vapor atmosphere so that they are contacted with the vapor. Alternatively, pines, bars, rollers, drums or the like are arranged to define a zigzag passage for the fibres. During passing through the zigzag passage the fibres are exposed to a stream of the solvent vapor.

An alternative solvent treatment is carried out by impregnating the fibres with the solvent and subsequently evaporating the solvent slowly at a temperature preferably below 100° C.

In carrying out these solvent treatments care should be taken not to excessively swell or plasticize the fibres. An excessive swelling or plasticizing will cause the tendency of the fibres after drying toward hardening, flattening in cross-sectional shape and adhering with each other. If there is a danger of such excessive swelling or plasticizing it should be controlled by a suitable means such as by decreasing the affinity of the solvent with polypropylene by adding thereto a suitable amount of other solvent (such as a lower aliphatic alcohol, e.g. methanol, ethanol, etc.) which is comparatively weak in affinity with polypropylene. The action of the solvent may also be controlled by decreasing the temperature and/or by controlling the time of treatment.

It will be understood that the conditions of the solvent treatment may be experimentally selected depending upon the particular solvent employed, particular nature of voids present in the fibres to be treated, etc.

The other method for reducing, diminishing or substantially dissipating the voids of the fibres is to expose the fibres to an atmosphere at a temperature between about 120° C. and 160° C. substantially free from such solvent as mentioned before. This method may be carried out, for example, by treating the fibres by hot air in a conventional heat treating machine or by contacting the fibres with a surface heated at a temperature mentioned above. The time of this heat treatment may vary depending upon the temperature, but usually within the range from 1 to 30 minutes.

While the treatments with dyes and other treating agents, and for enlarging the molecular dimensions of the treating agents and for reducing, diminishing or dissipating the voids have been explained as applied to fibres or filaments, the same treatments may equally be applicable to various types of products (e.g. yarns, threads, fabrics, articles of clothing, etc.) made of the fibres. Therefore, the term "fibres," "filaments" or the like as used in connection with these treatments is intended to mean also the products thereof.

Throughout the specification including the following examples, the optical microscopic observation was made by using SKO-Type optical microscope (manufactured and sold by K. K. Shimadzu Seisakusho, Kyoto, Japan) with an ocular or eye-piece of Heugens ($\times 10$) and an objective of Achromat ($\times 40$, number of aperture 0.65). The resolving power of this microscope under ordinary illumination was about $0.5\mu$. In the observation under dark-field illumination the above microscope was attached with a conventional condenser for dark-field illumination. The resolving power of the microscope under the dark-field illumination was about $0.1\mu$. The microscopic observation was carried out in the usual manner.

*Example 1*

An isotactic polypropylene resin of 63,000 in molecular weight, 4.80 in melt index and 0.6% in the n-heptane extract was melted at a temperature of 240° C. The molten polypropylene was fed by a conventional measuring gear pump to a spinning nozzle with 80 holes (each 0.8 mm. in diameter) to be extruded therethrough at a temperature of 235° C. Below the spinning nozzle there was provided an enclosure extending (5 cm. in length) downwardly from the lower face of the nozzle. The enclosure was surrounded by an electric heating element to heat the interior of the chamber at a temperature of 120° C. Below the said enclosure was connected a temperature controlling cylinder (3.5 m. in length) depending downwardly therefrom. Preheated air was introduced into this cylinder to maintain the interior temperature of the cylinder at 80° C. The extruded filaments were passed downwardly through the first enclosure and the temperature controlling cylinder to be gradually and slowly cooled, and then wound on a bobbin arranged below the temperature controlling cylinder at a speed of 650 m./min. (drawing ratio 520). The non-stretched fibres wound on the bobbin were left standing for one hour within a thermostatic chamber of 105° C. and then stretched 3.4 times their original length in hot water at 100° C. Thereafter the stretched fibres were heat treated at 130° C. for 30 minutes under tension.

The specific gravity of the non-stretched fibres before the seasoning treatment was 0.894, and their index of birefringence was 0.0121. After the seasoning treatment but before stretching, the fibres had a specific gravity of 0.904. The structured-polypropylene fibres after the final or stretching treatment had a water-absorbency of 17.6%, a solvent-absorbency of 57.6%, a water-retentivity of 4.1% and a solvent-retentivity of 6.5%.

The water-retentivity of the fibres has been determined by the method wherein a centrifugally dehydrated sample as prepared in the determination of water-absorbency mentioned before was left standing for 24 hours in an atmosphere of 60% in relative humidity at 20° C. and weighed to measure the weight increase as compared with the original weight of the fibres. The water-retentivity is expressed by the increased weight divided by the original weight by the fibres, in percent. The solvent-retentivity was measured in the same manner as the water-retentivity except that a centrifuged sample as prepared in the determination of solvent-absorbency mentioned before was employed.

When the structured polypropylene fibre was observed from the side thereof by the optical microscope under dark-field illumination, the whole was seen to be glimmering and it was impossible to distinguishably recognize each or individual void. When hand cut sections (each 0.5 mm. in thickness) of the structured polypropylene fibres were observed through the optical microscope under ordinary illumination they appeared cloudy yellow uniformly throughout the whole sectional area. The strength of the fibres was 4.5 g./denier, and the elongation was 60%.

The structured polypropylene fibres were dyed in a 1.5% OWF aqueous dispersing liquid of refined Celiton Fast Red 4G (bath ratio 1:100) at 100° C. for one hour and rinsed with water. The amount of the dye absorbed by the fibres was 9.04 mg. per gram of the fibres, which were dyed deeply and fastly.

*Example 2*

The procedure of Example 1 for the production of structured polypropylene fibres was repeated except that the spinning temperature at the nozzle was 250° C. The structured polypropylene fibres thus produced had a water-absorbency of 6.2%, water-retentivity of 1.2%, solvent-absorbency of 6.2%, solvent-retentivity of 2.8%, and index of birefringence of 0.011. The optical-microscopic observations of the fibres showed similar results as those of Example 1. The amount of the dye absorbed by the fibres was 3.40 mg. per gram of the fibres, which were dyed deeply and fastly. The specific gravity of the fibres before the seasoning or aging treatment was 0.892.

*Example 3*

A blend of 95% of the polypropylene resin employed in Example 1 and 5% of an epoxy resin (Epikot 1009) was spun and treated as in Example 1 except that the spinning temperature at the nozzle was 250° C. The water-absorbency, solvent-absorbency, water-retentivity, solvent-retentivity and results of the microscopic observations of the fibres thus obtained were substantially identical with those of Example 1. When dyed as in Example 1 the amount of the dyestuff absorbed was 11.3 mg. per gram of the fibres, which were more deeply and fastly dyed.

*Example 4*

Structured polypropylene fibres having voids produced by the same manner as Example 1 were dipped in an aqueous liquid in which were dispersed 3-hydroxy-2-naphtho-o-toluidine and 4-amino-3-nitrotoluene, each 10% based on the weight of the fibres, by the aid of a nonionic dispersing agent. The temperature of the bath was increased from 60° C. up to 120° C. which temperature was maintained for one hour. Then the fibres were dipped in an aqueous solution containing 12% (based on the fibre weight) of sulfuric acid and 8% (based on the fibre weight), for 20 minutes at 70° C. to effect the diazotizing reaction. In this way the fibres were dyed to deep red. The fastness of the dyed fibres was excellent and was class 4 in fastness to light and class 5 in each of fastness to washing and fastness to rubbing.

*Example 5*

The procedure of Example 1 for the production of structured polypropylene fibres with voids was repeated except that the temperature within the temperature controlling cylinder was maintained to be about 75° C. and that the seasoning treatment was carried out at 120° C. for one hour and the stretching was 4.0 times the original length. Before the seasoning treatment the fibres had a specific gravity of 0.895 and an index of birefringence of 0.015. After the seasoning but before the stretching, the fibres had a specific gravity of 0.903. After the final or stretching treatment, the structured polypropylene fibres was 31.7% in water-absorbency, 8.7% in water-retentivity (measured as in Example 1), 70.5% in solvent-absorbency and 7.2% in solvent retentivity (measured as in Example 1). When dyed as in Example 1, the dyestuff was absorbed by the fibres in an amount of 12.4 mg. per gram of the fibres, which were dyed deeply. The results of the microscopic observations of the fibres before dyeing were same as those of Example 1 and the fibres had a strength of 6.2 g./denier and elongation of 25%.

*Example 6*

The structured polypropylene fibres prepared by the procedure of Example 3, but before dyeing, were dipped in an aqueous bath (bath ratio 1:40) wherein were dispersed 8% OWF of Disperse Blue 1 (C.I. 64500) and 5% OWF of 2,4-dichloro-6-aniline-1,3,5-triazone with the aid of an anionic surfactant. The temperature of the bath was increased to 120° C. which temperature was maintained for one hour. The dyed fibres were washed with water and dipped in an aqueous solution containing 1% of sodium carbonate and treated therein for 30 minutes at 100° C. Then the fibres were washed with water and dried. The fibres could be dyed deeply and fastly.

*Example 7*

The structured polypropylene fibres prepared by the procedure of Example 1, but before dyeing were dipped in 100% ethyleneimine and treated for one hour at 30° C. After squeezing, the fibres were dipped in a slightly acidic water at 5° C. for 30 minutes. Then the fibres were washed with water, dehydrated and dried. The treated polypropylene fibres were excellent in antistaticity and dyeability.

*Example 8*

An isotactic polypropylene resin (same as that employed in Example 1) was spun by the same spinning apparatus as Example 1 except that the spinning temperature was 250° C. and the winding speed was 650 m./min. (drawing ratio 520). The non-stretched fibres thus produced were 0.8915 in specific gravity, 0.011 in index of birefringence, and had a monoclinic crystalline structure. A sample (wound on bobbin) of the non-stretched fibres was subjected to seasoning at 105° C. for one hour. The other sample (wound on bobbin) of the same non-stretched fibres was subjected to seasoning at 130° C. for one hour. In both cases, the fibres after the seasoning treatment had a monoclinic crystalline structure. The fibres seasoned at 105° C. had a specific gravity of 0.9032 and an index of birefringence of 0.016, while the fibres seasoned at 130° C. had a specific gravity of 0.9088 and an index of birefringence of 0.017. These fibres were stretched 3.5 times their original length in hot water of 100° C. and then set under non-tension in dried air at 120° C. for 30 minutes. The results of optical-microscopic observations on these final fibres were similar to those of Example 1. The final fibres produced through seasoning at 105° C. absorbed 6.48 mg. of the dye per gram of the fibres when dyed as in Example 1 and had a water-absorbency of 10.5%, while the fibres produced through seasoning at 130° C. absorbed 10.32 mg. of the dye per gram of the fibres and had a water-absorbency of 27.4%.

*Example 9*

The structured polypropylene fibres produced by the procedure of Example 8 wherein the seasoning treatment was effected at 130° C. were dipped in a bath (bath ratio 1:10) of warm water containing 0.01% of a nonionic surfactant. Then Disperse Orange 1 (C.I. 11080) and 48% acetic acid were added to the bath so that the bath will be 2% in the dye concentration and 1% in the acid concentration. The fibres were dyed in this bath at 100° C. for 60 minutes. After dyeing, the fibres were rinsed with water, squeezed uniformly and air dried. The dyed fibres were then placed in a chamber containing n-heptane. The chamber was closed and the interior was made vacuum maintained at 60° C. After one hour the fibres were transferred from the chamber to a dryer at 70° C. to slowly dry the fibres. The fibres were dyed deeply and excellent in fastness.

*Example 10*

The fibres produced by the procedure of Example 3, but before dyeing, were treated by passing zigzag through and along rollers arranged within a closed chamber. During the passage through the chamber the fibres were exposed to a vapor stream (at 85° C.) of a mixture of carbon tetrachloride and ethanol (1:1). By this treatment the fibres were improved in luster and their dyeability (absorptivity of dyestuffs) was decreased. The microscopic observations of the fibres disclosed that the voids had substantially dissipated.

*Example 11*

An isotactic polypropylene resin (same as that used in Example 1) was spun by the same spinning apparatus as in Example 1, except that the spinning temperature at the nozzle was 235° C. and the winding speed was 350 m./min. (drawing ratio 280) in one experiment and 800 m./min. (drawing ratio 640) in another experiment. In both cases the non-stretched filaments obtained were monoclinic in crystalline structure. The unstretched fibers wound at the speed of 350 m./min. had a specific gravity of 0.8956, an index of birefringence of 0.007 and a degree of orientation of 73%, while the fibres wound at the speed of 800 m./min. had a specific gravity of 0.8938, an index of birefringence of 0.016 and a degree of orientation of 92%. These samples were subjected to seasoning at 105° C. for one hour and stretched 3.5 times their original length in hot water. After this treatment voids were produced in the fibres which were wound at 800 m./min., but not in the fibres which were wound at the speed of 350 m./min.

*Example 12*

The filaments of Example 11 wherein the winding speed was 800 m./min. could be dyed as in Example 4 to deep shades and fastly as in Example 4.

*Example 13*

The unstretched fibres obtained in Example 2 were heat treated at 100° C., 120° C. and 140° C. respectively, for 30 minutes without tensioning. The dye absorbency (Celliton Fast Red 4G), water-absorbency and water-retentivity of these fibres were as follows:

| Heat treat. temp., ° C. | Dye/Fibre, weight percent | Water-absorbency | Water-retentivity |
| --- | --- | --- | --- |
| 100 | 9.32 | 19.6 | 5.2 |
| 120 | 6.32 | 10.1 | 3.1 |
| 140 | 1.30 | 3.7 | 0.3 |

Microscopic observations of the fibres heat-treated at 100° C. and 120° C. respectively disclosed the formation of voids, but not for the fibres treated at 140° C.

*Example 14*

The fibres of Example 13 wherein the heat-treatment was effected at 120° C. were heat treated at 145° C. for 5 minutes, so that the voids were almost disappeared.

*Example 15*

A polypropylene resin of 143,000 in molecular weight and 1.28 in melt index (by ASTM–D–1238–57 TE method except that the load was 5 kg.) was spun by the same apparatus as Example 1 except that the spinning temperature at the nozzle was 280° C. and the winding speed was 675 m./min. (drawing ratio 540). The non-stretched fibres thus produced had a specific gravity of 0.8863 and an index of birefringence of 0.009, and was smectic in crystalline structure. The non-stretched filaments wound on a bobbin were subjected to a seasoning treatment at 105° C. for one hour. After seasoning the filaments were stretched 80% of maximum possible stretch at which the fibre breaks. However no void formation occurred in the fibres.

When the same procedure was repeated except that the spinning temperature was raised to 270° C., fibres having voids of this invention and excellent in dyeability were obtained. In this case, the non-stretched fibres had a specific gravity of 0.8973 and an index of birefringence of 0.018, and were monoclinic in the crystalline structure.

*Example 16*

A polypropylene polymer (same as that used in Example 1) was extruded at 250° C. through a spinning nozzle having 24 holes (each 0.8 mm. in diameter). No first enclosure as in example was provided below the nozzle, but only a temperature controlling cylinder was connected adjacent and below the nozzle. Air preheated at 80° C. was introduced into the temperature controlling cylinder. The spun filaments after passing through this cylinder were wound at a speed of 600 m./min. (drawing ratio 430). The non-stretched filaments thus produced had a specific gravity of 0.8968 and an index of birefringence of 0.014. The filaments as wound on a bobbin were subjected to a seasoning treatment at 100° C. for one hour, and then stretched 3.5 times their original length within a dry heat stretching cylinder interior of which was maintained at 120° C. Then the filaments were wound upon a bobbin and heat treated at 130° C. for 15 minutes. Void formation occurred in the filaments so treated. The structured filaments could be deeply dyed with Celliton Fast Red 4G. The fibres had a breaking strength of 4.5 g./d. and an elongation of 40%.

What we claim is:

1. A melt-spun structured polypropylene fiber having numberless ultra-fine voids distributed throughout the fiber and having an initial solvent-absorbency greater than 25%, said voids being so fine and so distributed throughout the fiber that it is difficult to distinguishably recognize the individual voids under observation by an optical microscope in bright field illumination, the whole fiber having a glimmering aspect when observed by an optical microscope under dark field illumination. said fiber containing in the voids at least one substance selected from the group consisting of dyestuffs, their intermediates, light-stabilizers, heat-stabilizers, surfactants, softeners, flame resistors, antistatic agents, mordanting agents, polymerizable compounds, solvents and water.

2. A method for preparing a melt-spun structured polypropylene fiber having numberless ultra-fine voids distributed throughout the fiber and having an initial solvent absorbency greater than 25%, said voids being so fine and so distributed throughout the fiber that it is difficult to distinguishably recognize the individual voids under observation by an optical microscope in bright field illumination, the whole fiber having a glimmering aspect when observed by an optical microscope under dark field illumination, said fiber containing in the voids at least one substance selected from the group consisting of dyestuffs, their intermediates, light-stabilizers, heat-stabilizers, surfactants, softeners, flame resistors, antistatic agents, mordanting agents, polymerizable compounds, solvents and water, which comprises absorbing the said substance into the said fiber.

3. A method for preparing a melt-spun structured polypropylene fiber having numberless ultra-fine voids distributed throughout the fiber and having an initial solvent absorbency greater than 25%, said voids being so fine and so distributed throughout the fiber that it is difficult to distinguishably recognize the individual voids under observation by an optical microscope in bright field illumination, the whole fiber having a glimmering aspect when observed by an optical microscope under dark field illumination, said fiber containing in said voids a substance of high molecular weight synthesizable from reactants of lower molecular weight, which comprises impregnating the fiber with said reactants in amount sufficient to fill said voids, and then subjecting the fiber to conditions which result in reaction between said reactants, whereby said substance of high molecular weight is formed in situ in said voids.

4. A method according to claim 3, wherein said reactants comprise a diazo component and a coupling compound, whereby a dyestuff of higher molecular weight is produced in situ in said voids.

5. A method for after-treating the structured polypropylene fibers of claim 1, which comprises subjecting the fibers containing the substance(s) to a treatment for reducing, diminishing or substantially dissipating the said voids.

6. A method as claimed in claim 5, in which the treatment is carried out by contacting the fibers with a vapor of an organic solvent which is capable of swelling or plasticizing polypropylene.

7. A method as claimed in claim 5, in which the treatment is carried out by impregnating the fibers with an organic solvent which is capable of swelling or plasticizing polypropylene and then gradually evaporating the solvent.

8. A method as claimed in claim 5, in which the treatment is carried out by heating the fibers at a temperature of from 120° C. to 160° C. and in substantial absence of a solvent for the polypropylene.

References Cited by the Examiner

UNITED STATES PATENTS

| | | | |
|---|---|---|---|
| 3,020,247 | 2/62 | Bianco | 8—55 |
| 3,024,208 | 3/62 | Goethel et al. | 260—2.5 |
| 3,072,972 | 1/63 | Yokose et al. | 260—2.5 X |
| 3,098,096 | 7/63 | Feeman | 8—46 X |
| 3,102,323 | 9/63 | Adams. | |
| 3,118,161 | 1/64 | Cramton. | |

FOREIGN PATENTS

| | | |
|---|---|---|
| 563,932 | 6/60 | Belgium. |
| 873,178 | 7/61 | Great Britain. |

NORMAN G. TORCHIN, *Primary Examiner.*